United States Patent  [15] 3,665,706
Price  [45] May 30, 1972

[54] IGNITER-ATTENUATOR DEVICE FOR ATTENUATING COMBUSTION INSTABILITY IN ROCKET MOTORS

[72] Inventor: Edward W. Price, China Lake, Calif.

[73] Assignee: The United States of America as represented by the Secretary of the Navy

[22] Filed: Oct. 22, 1970

[21] Appl. No.: 82,881

[52] U.S. Cl.....................60/39.72 P, 60/39.82 E, 60/256
[51] Int. Cl...........................................F02k 9/04
[58] Field of Search.............60/256, 39.72 P, 39.82 E, 39.47, 60/39.77; 181/59, 33 HB

[56] References Cited

UNITED STATES PATENTS

| | | | |
|---|---|---|---|
| 2,807,931 | 10/1959 | Bodine | 181/33 HB |
| 3,258,910 | 7/1966 | Seymour | 60/256 |
| 3,177,651 | 4/1965 | Lawrence | 60/256 X |
| 3,555,825 | 1/1971 | Dilchert | 60/256 X |
| 2,853,852 | 9/1958 | Bodine | 181/33 HB |
| 3,368,354 | 2/1968 | Adelman | 60/39.72 P |
| 3,141,520 | 7/1964 | Kurtze | 181/59 |

OTHER PUBLICATIONS

Kinsler, L. E. Fundamentals of Acoustics, John Wiles & Sons, Inc. N.Y. 1951, pp. 198– 201, 216– 219 U.S. Patent Office Library
Solid Propellant Rocket Research, Martin Summerfield, Ed., Academic Press, N.Y., 1960 pp. 296– 299, 602– 605, 610– 611, U.S. Patent Office Library Primary Examiner—Douglas Hart
Attorney—R. S. Sciascia and Roy Miller

[57] ABSTRACT

A device for attenuating oscillatory combustion in solid rocket motors which comprises an igniter-attenuator device attached at the forward end of a rocket motor combustion chamber so that oscillatory combustion is effectively attenuated.

3 Claims, 3 Drawing Figures

Patented May 30, 1972 3,665,706

INVENTOR.
EDWARD W. PRICE

BY ROY MILLER
ATTORNEY.

IGNITER-ATTENUATOR DEVICE FOR ATTENUATING COMBUSTION INSTABILITY IN ROCKET MOTORS

GOVERNMENT INTEREST

The invention described herein may be manufactured and used by or for the government of the United States of America for governmental purposes without the payment of any royalties thereon or therefor.

BACKGROUND OF THE INVENTION

The invention pertains to means for attenuation of oscillatory combustion of a rocket motor, where the attenuation means is contained wholly within a rocket motor igniter, the total exterior size of the igniter-attenuator device being no greater than that of an igniter alone.

Oscillatory combustion is a well known, unwanted phenomenon which occurs in rocket motors. This phenomenon may produce such adverse effects as affecting the burning rate of the propellant and, consequently, the operating pressure of the motor, producing false signals within the rocket which may, in turn, affect the guidance controls and mechanically damaging the rocket components.

A variety of techniques have been used to eliminate or minimize this behavior including changes in propellant formulation and changes in charge design. Experiments have been performed with devices designed to provide accoustic attenuation such as a Helmholtz oscillator. However, there is not usually sufficient space available in a rocket motor to accomodate an effective Helmholtz oscillator, so it has not seen extensive use as a combustion stabilizer.

Briefly, a Helmholtz oscillator consists of a cavity into which gas enters and leaves by a port leading to the cavity. The pressure of gas in the cavity changes as it is alternately compressed and expanded by the influx and efflux of gas through the port causing resonance within the chamber.

These techniques do not provide predictable effects and usually involve compromise in other aspects of performance, as well as in development schedule and cost. Inadequate correction of the problem can cause low reliability of the weapons system.

The present invention provides attenuation of unacceptable oscillatory behavior in a rocket motor without compromising any aspects of performance. This is accomplished by including the attenuation means wholly within the igniter without increasing the external size of the igniter.

DESCRIPTION OF THE PREFERRED EMBODIMENTS

Figure 1:
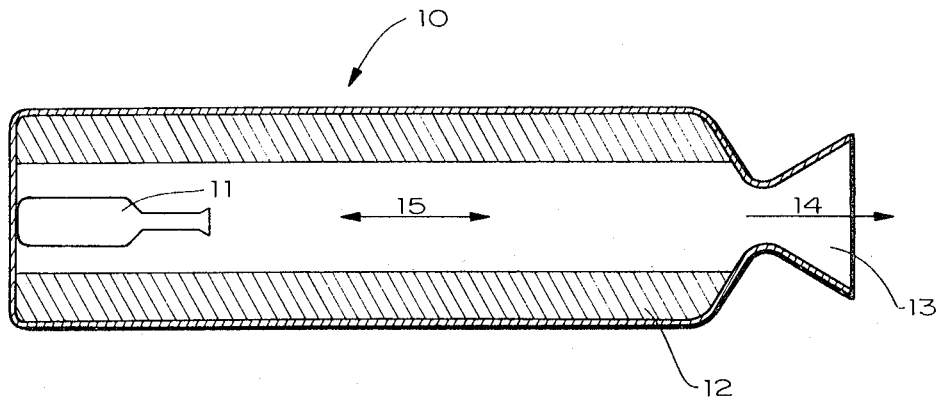
FIG. 1 shows the location of an igniter-attenuator within a rocket motor.

FIG. 1 illustrates a solid propellant rocket motor 10 including at its forward end an igniter-attenuator device 11 constituting a Helmholtz oscillator, a rocket motor fluted propellant grain 12 around the internal periphery of the rocket motor and a nozzle 13 at the rearward end of the motor. Arrow 14 indicates the direction of gas flow through the nozzle; arrow 15 indicates the direction of the oscillatory combustion oscillations.

Figure 2:
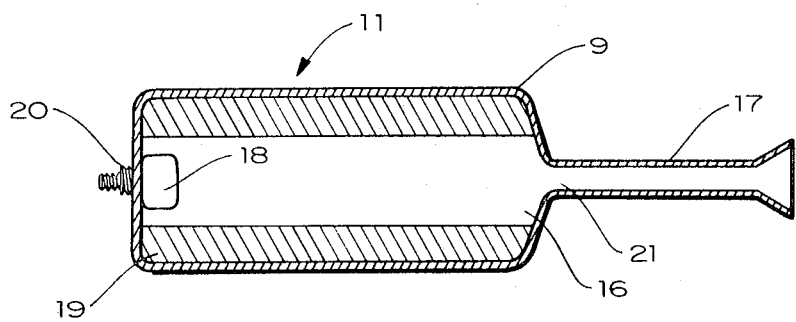
FIG. 2 shows the igniter-attenuator before combustion.

FIG. 2 illustrates the main body 9 of the igniter-attenuator 11 defining the Helmholtz oscillator cavity 16 which includes the volume occupied by an igniter charge 19 and an initiator charge 18. A tubular shaped neck 17 extends rearwardly from port 21 located at the rear of the Helmholtz oscillator cavity 16. An initiator 18 mounted on the forward interior wall of the igniter-attenuator 11 serves to start combustion of the igniter charge 19 located around the internal periphery of the igniter-attenuator 11. The igniter-attenuator is attached to the forward, interior end of the rocket motor by means of a screw thread connection 20.

Oscillators of this type have been shown in laboratory tests to provide strong attenuation of oscillatory combustion when connected to a rocket motor near the pressure antinode of a standing accoustic mode of cavity. The mechanism by which the Helmholtz oscillator attenuates oscillations involves its participation in the gas oscillations occurring in the rocket motor. By suitable design, it is tuned so that a maximum interaction with the oscillatory flow occurs. This in turn provides enhanced viscous dissipation of oscillatory energy.

In addition, the amplitude of oscillation in the combustor is reduced by the out-of-phase flow of gas into the cavity, with a corresponding weakening of the combustion disturbances that are causing the oscillation. A further detailed discussion of the Helmholtz oscillator can be found in chapter 8 of the second edition of "Fundamentals of Acoustics" by Kinsler and Frey (published by John Wiley and Sons, 1962).

Figure 3:
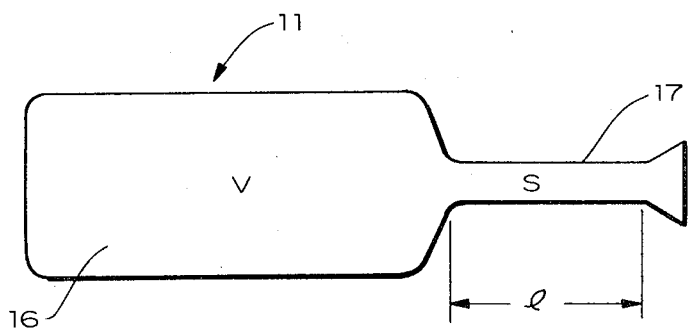
FIG. 3 shows the igniter-attenuator after combustion.

The attenuator is tuned when the geometry satisfies the relation $f = a \sqrt{s/lv}$, where f is the oscillation frequency of the rocket motor cavity, a is the velocity of sound in the gas of the rocket motor cavity, s is the transverse cross sectional area of the neck of the cavity, V is the volume of the cavity, and l is the length of the neck all as seen in FIG. 3.

What is claimed:
1. In a reaction motor having a combustion chamber, means for attenuating oscillatory combustion in said chamber comprising:
   attenuator means within said chamber in the form of a Helmholtz oscillator cavity;
   said cavity containing consumable ignition means; the opening of said cavity being in open communication with said chamber.
2. The apparatus of claim 1 further comprising means securing said attenuator means to the interior of said combustion chamber.
3. The apparatus of claim 1 wherein said combustion chamber comprises a forward wall, and said attenuator means is secured to said wall.

* * * * *